(12) United States Patent
Hsu et al.

(10) Patent No.: US 6,578,677 B2
(45) Date of Patent: Jun. 17, 2003

(54) BRAKING DEVICE OF LINEAR GUIDE

(75) Inventors: Chin-Mou Hsu, Kaohsiung (TW);
Ching-Yuan Lin, Taichung (TW);
Hsi-Hung Hsiao, Taichung (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 10/042,566

(22) Filed: Nov. 21, 2001

(65) Prior Publication Data

US 2003/0094334 A1 May 22, 2003

(51) Int. Cl.$^7$ ................................................. B61H 7/12
(52) U.S. Cl. ......................................................... 188/43
(58) Field of Search ............................. 188/43, 38, 41, 188/42, 60, 153 R, 170; 104/118, 119, 252, 259; 105/141, 144; 384/43–50, 54

(56) References Cited

U.S. PATENT DOCUMENTS

| | | | |
|---|---|---|---|
| 5,044,780 A | * | 9/1991 | Teramachi .................... 384/44 |
| 5,732,799 A | * | 3/1998 | Chikamatsu et al. ......... 188/67 |
| 6,179,468 B1 | * | 1/2001 | Thorstens et al. ............ 384/40 |
| 6,227,336 B1 | * | 5/2001 | Rudy .......................... 188/43 |
| 6,336,528 B1 | * | 1/2002 | Rudy .......................... 188/43 |

\* cited by examiner

*Primary Examiner*—Christopher P. Schwartz
*Assistant Examiner*—Xuan Lan Nguyen

(57) ABSTRACT

A braking device of a linear guide comprises a braking slide seat which is mounted on the guide. The braking slide seat is provided with a braking rod which is provided in the mid-segment with an insertion slot having a tapered bevel and in the rear end with a disk spring for pushing the front end of the braking rod to make a frictional contact with the guide. An urging rod is powered by a hydraulic or a pneumatic source to enter the insertion slot to cause the braking rod to move away from the guide. In the event of a power outage, the urging rod is retreated from the insertion slot, the braking rod is urged by the spring to make a frictional contact with the guide, thereby exerting a braking force on the guide to bring the slide seat to an abrupt halt.

9 Claims, 4 Drawing Sheets

BRAKING DEVICE OF LINEAR GUIDE

FIELD OF THE INVENTION

The present invention relates generally to a linear guide brake device, and more particularly to a linear guide brake device which is highly reliable and rapidly responsive to an emergency power interruption.

BACKGROUND OF THE INVENTION

The linear guides are broadly applied to various production means, such as machine tools, work stations, conveying facilities, etc. The linear guides are mainly intended for use in a slide seat which is provided with a power source. The slide seat is used to mount thereon an operation platform or equipment, which is made to slide linearly along the linear guides by means of the power of the slide seat. The interior of the main body of the slide seat is generally devoid of a braking mechanism. In the event of an emergency power interruption, the slide seat in motion is incapable of stopping at once due to its motion inertia. As a result, the operation platform mounted on the slide seat is vulnerable to damage which is caused by the impact. In light of the modern machine tools capable of advancing at a high speed, they are incapable of coming to an abrupt halt in the event of a power outage, thereby resulting in a collision incident in which the workpiece and the tools are damaged. Such collision incident of the slide seat is also hazardous to the machine operator. It is therefore readily apparent that the slide seat must be provided with a means to enable the slide seat in motion to come to an instant stop in case of a power interruption.

SUMMARY OF THE INVENTION

The primary objective of the present invention is to provide a braking device of the linear guides. The linear guide is provided with a braking slide seat which is slidable and provided therein with a braking rod perpendicular to the guide.

The braking rod is provided at the rear end with a disk spring serving to urge the braking rod such that the front end of the braking rod makes contact with the guide so as to bring about a braking effect. The braking rod is provided in the mid-segment with an insertion slot having a tapered bevel. A piston rod is driven by a power source to enter the insertion slot such that the piston rod urges the tapered bevel of the insertion slot, so as to enable the braking rod to retreat to become separated from the guide. Under the circumstance of a normal operation, the piston rod keeps urging the braking rod so as to keep the braking device inactive, thereby enabling the braking slide seat to slide linearly on the guide. In case of a power interruption, the piston rod is no longer provided with the power and is therefore incapable of urging the braking rod. In the meantime, the spring force of the disk spring of the rear end of the braking rod forces the braking rod to move out to affect an instant braking action. The braking force of the braking rod has a large load, a high degree of reliability, and a rapid response. The present invention is therefore capable of averting the collision incident of the operation platform which is mounted on the slide seat.

The features and the advantages of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 1:
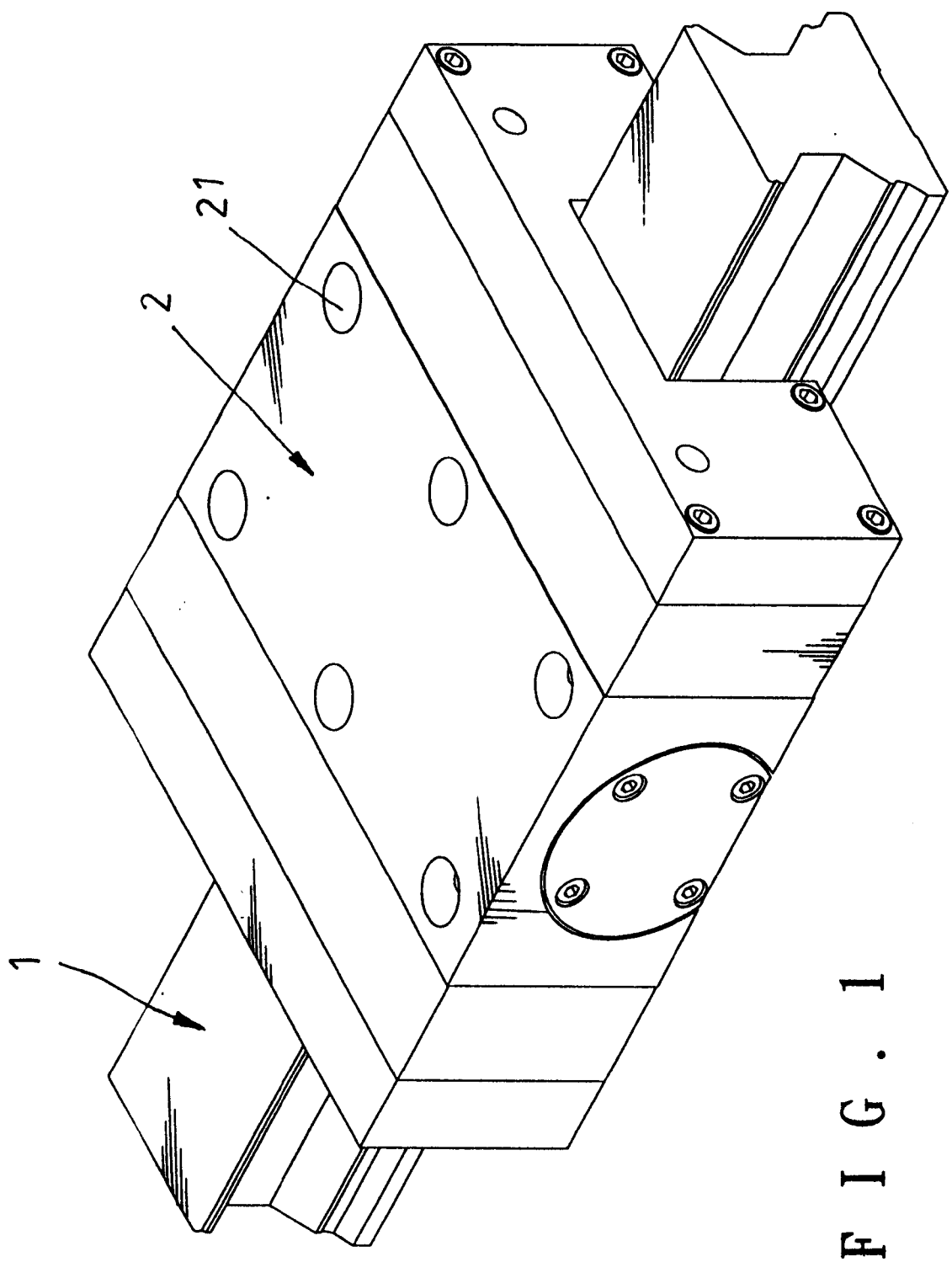
FIG. 1 shows a perspective view of the preferred embodiment of the present invention.
Figure 2:
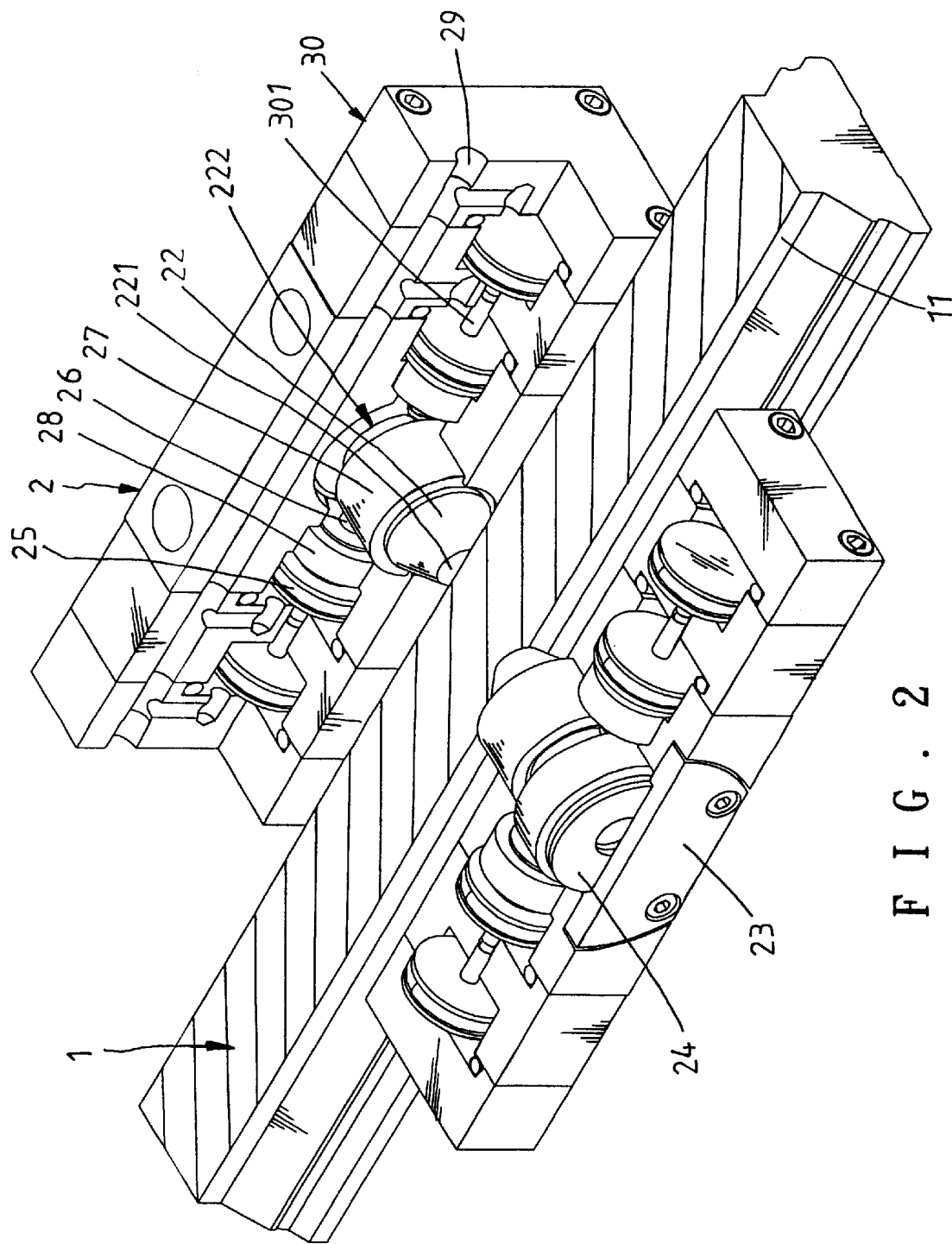
FIG. 2 shows a sectional schematic view of the preferred embodiment of the present invention.

As shown in all drawings provided herewith, the preferred embodiment of the present invention comprises a braking slide seat 2 which is mounted on a linear guide 1 and is provided with a plurality of threaded holes 21 for use in fastening an operation platform. The slide seat 2 slides linearly on the linear guide 1. Now referring to FIG. 2, the slide seat 2 is provided therein with a braking rod 22 which is perpendicular to the linear guide 1 and is provided at the rear end thereof with a plurality of disk springs 24. The disk springs 24 are located between the braking rod 22 and a side cover 23 such that the spring forces of the disk springs 24 cause the braking rod 22 to extend out to enable a rough surface 221 of the front end of the braking rod 22 to make contact with a friction surface 11 of the guide 1. The friction surface 11 is a vertical surface and is therefore not a main sliding portion when it is fitted with the braking slide seat 2. As a result, the friction effect does not affect the sliding smoothness of the slide seat 2 on the guide 1. The braking rod 22 is provided in the mid-segment with an insertion slot 222 which has a tapered bevel. Located in positions opposite to two sides of the insertion slot 222 are two urging rods 26 which are pushed to act by the piston 25. When the piston is in action, the urging rod 26 is pushed into the insertion slot 222 of the braking rod 22, thereby resulting in retreat of the braking rod 22. The power source of the piston 25 may be a hydraulic or pneumatic source, which enters from the inlet 29. In order to enhance the thrust of the urging rod 26, a pressure-enhancement cylinder 30 is provided such that a piston rod 301 of the pressure-enhancement cylinder 30 is connected to the urging rod 26. In order to facilitate the sliding of the braking rod 22 and the urging rod 26, they are respectively fitted with a support bearing 27, 28. The other guide surface of the linear guide 1 is provided with a symmetrical braking device so as to provide a balanced and faster braking effect.

Figure 3:
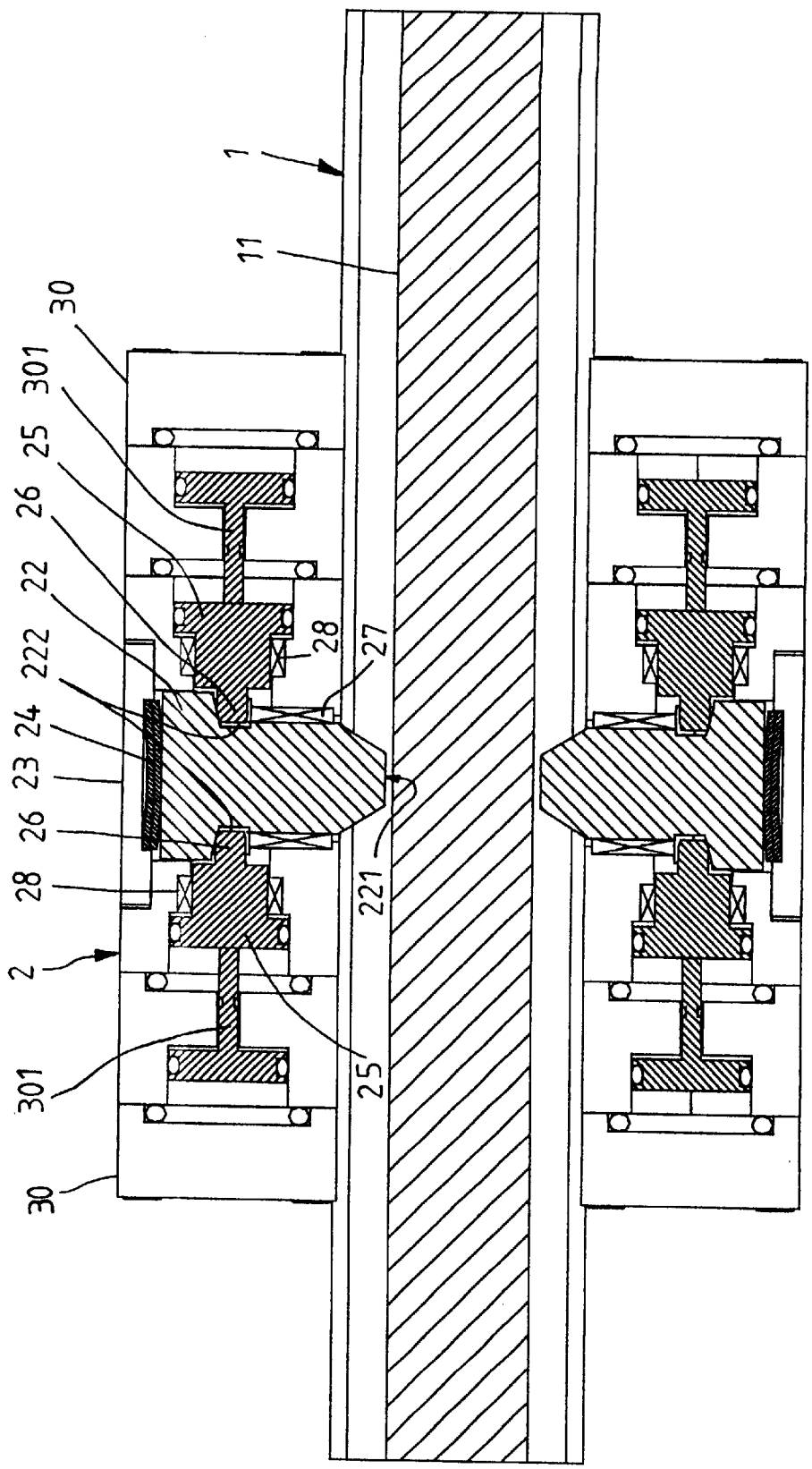
FIG. 3 shows a schematic view of the preferred embodiment of the present invention in the state of inactivation.

As shown in FIG. 3, when the present invention is in the normal operation, the machine is provided with a hydraulic or pneumatic system, which serves to enable the urging rod 26 to extend out to urge the tapered bevel of the insertion slot 222 of the braking rod 22, thereby causing the braking rod 22 to retreat to compress the disk springs 24. In the meantime, the rough surface 221 of the front end of the braking rod does not make contact with the friction surface 11 of the linear guide 1. In view of the installment of the pressure-enhancement cylinder 30, the thrust of the urging rod 26 is thus enhanced so as to ensure that the braking rod 22 is effectively pushed by the urging rod 26 to retreat to relieve the braking effect.

Figure 4:
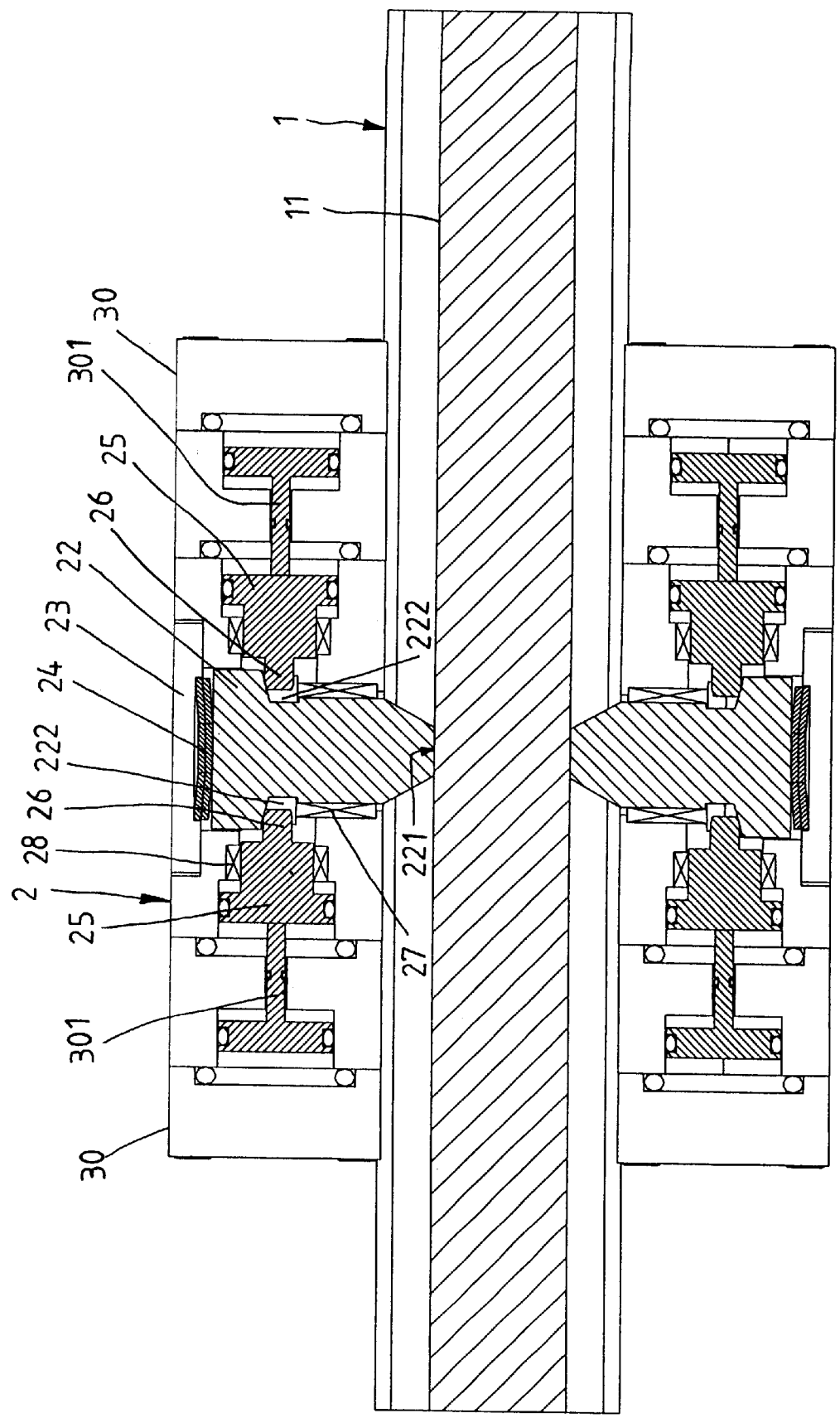
FIG. 4 shows a schematic view of the preferred embodiment of the present invention in action.

As shown in FIG. 4, in the event of a power interruption, the present invention is instantaneously devoid of the hydraulic or pneumatic power source, thereby causing the urging rod 26 to lose its thrust. However, the braking rod 22 is caused by the spring force of the disk springs 24 and the pushing of the tapered bevel of the insertion slot 222 to extend out such that the rough surface 221 of the braking rod 22 makes contact with the friction surface 11 of the guide 1. As a result, the braking force is instantaneously affected to bring the slide seat 2 in motion to a halt, so as to avert the collision incident.

The present invention makes use of the existing hydraulic or pneumatic power source to push the urging rod to inactivate the braking device without increasing the load of the facilities. The present invention is simple in construction, capable of carrying a large load, and highly reliable. The present invention is capable of a fast and excellent braking action. The present invention described above is nonrestrictive and may be therefore embodied in other specific forms without deviating from the spirit thereof. The present invention is therefore to be limited only by the scopes of the following claims.

What is claimed is:

1. A braking device of a linear guide and having a braking slide seat mounted on the linear guide, said braking slide seat comprising:

a braking rod perpendicular to the linear guide and having a front end capable of extending to make contact with the guide, said braking rod provided in a mid-segment with an insertion slot and in a rear end with an elastic element; and an urging rod disposed in a side opposite to said insertion slot of said braking rod such that said urging rod is connected with a piston which is driven by a power source whereby said urging rod is pushed by the piston in motion into said insertion slot of said braking rod so as to cause said braking rod to retreat from the braking state, said braking rod being pushed by the spring force of said elastic element to make contact with the guide so as to bring about a braking effect in the event of a power interruption.

2. The braking device as defined in claim 1, wherein said front end of said braking rod is provides with a rough surface.

3. The braking device as defined in claim 1, wherein said insertion slot of said braking rod is a tapered bevel.

4. The braking device as defined in claim 1, wherein said elastic element of said rear end of said braking rod is a disk spring.

5. The braking device as defined in claim 1, wherein said braking rod is fitted with a support bearing.

6. The braking device as defined in claim 1, wherein the power source of the piston of said urging rod is a hydraulic or pneumatic power source.

7. The braking device as defined in claim 6, wherein the hydraulic or pneumatic power source enters into the piston from an inlet.

8. The braking device as defined in claim 1, wherein said urging rod is fitted with a support bearing.

9. The braking device as defined in claim 1, wherein the piston of said urging rod is provided at a rear end with a pressure-enhancement cylinder whereby said urging rod is connected with a piston rod of the pressure-enhancement cylinder.

* * * * *